United States Patent [19]

de Putter et al.

[11] 4,131,407
[45] Dec. 26, 1978

[54] DEVICE FOR FORMING TUBE WITH THICKENED SOCKET END

[75] Inventors: Warner J. de Putter, Hardenberg; Willem C. den Hertog, Zwolle, both of Netherlands

[73] Assignee: Wavin B.V., Netherlands

[21] Appl. No.: 712,769

[22] Filed: Aug. 9, 1976

Related U.S. Application Data

[60] Continuation of Ser. No. 578,662, May 19, 1975, abandoned, which is a division of Ser. No. 352,329, Apr. 18, 1973, Pat. No. 3,899,565.

[30] Foreign Application Priority Data

Apr. 19, 1972 [NL] Netherlands ............... 7205280

[51] Int. Cl.² ................................ B29C 17/00
[52] U.S. Cl. ..................... 425/393; 425/DIG. 218
[58] Field of Search ......... 425/324 R, 392, DIG. 218, 425/398, 393; 264/294, 296, 322, 327; 72/393

[56] References Cited

U.S. PATENT DOCUMENTS

| 3,360,826 | 1/1968 | Lorang ........................... 425/392 |
| 3,755,528 | 8/1973 | Gutlhuber et al. ............ 425/398 X |

Primary Examiner—Richard B. Lazarus
Attorney, Agent, or Firm—Watson, Cole, Grindle & Watson

[57] ABSTRACT

A device for manufacturing a plastic tube having a thickened socket end and being provided with an inner circular groove. The device includes a socket forming mandril having a core member associated with it. The mandril is provided with a groove-forming member. A hollow die is also provided which has a portion adapted to fittingly cooperate with the outer side of the mandril. A hollow mould lies in an adjoining relationship with the hollow die and is disposed in front of the core member. The hollow mould has an inner diameter which is greater than the outer diameter of the mandril.

4 Claims, 6 Drawing Figures

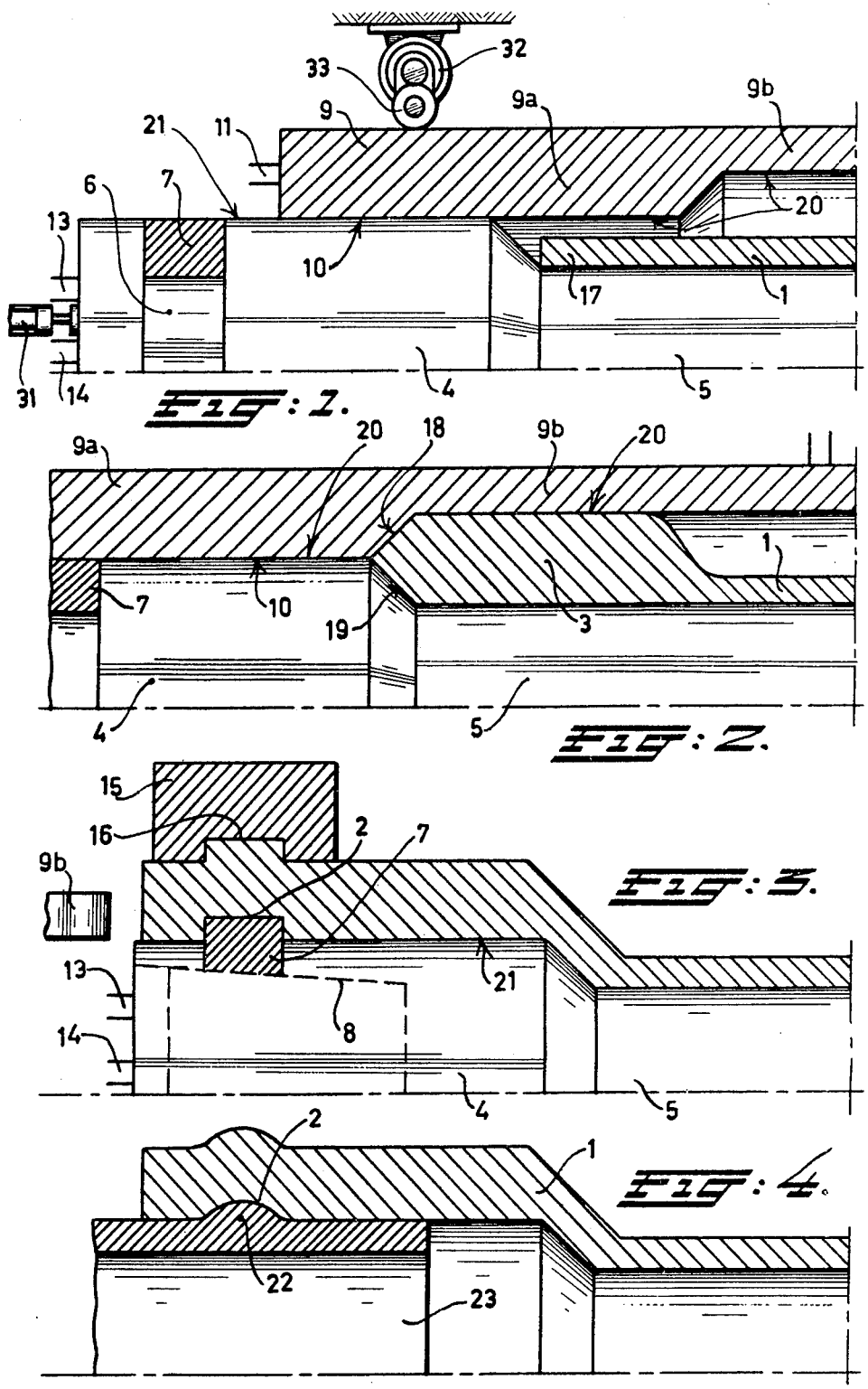

DEVICE FOR FORMING TUBE WITH THICKENED SOCKET END

The present application is a continuation application of application Ser. No. 578,662, filed on May 19, 1975, now abandoned, which was a divisional application of application Ser. No. 352,329, filed on Apr. 18, 1973, now U.S. Pat. No. 3,899,565.

BACKGROUND OF THE INVENTION

The present invention relates to a method for forming a socketed tube with a thickened end, provided with a circular inner groove, by deforming the tube which has been brought into a deformable condition by applying heat.

Such a method is known per se. According to this known method during the extrusion of a tube, the discharge rate of the tube is reduced such that, in a part thereof, a greater wall thickness is produced. This part of the tube with a thickened wall is thereupon, by a separate operation, provided with a socket end and a groove. The formation of the tube part with thickened wall during extrusion is, however, attended with the drawback that it cannot be assured that the wall thickening meets well defined conditions.

SUMMARY OF THE INVENTION

This invention aims to provide a method for manufacturing a tube with a circular inner groove in the thickened socket end by deformation of a part of the tube which has been brought into a deformable condition in the presence of heat.

Such a tube is produced, in accordance with the present invention, by a method in which:

(a) an end part of the tube is heated to a temperature above the temperature at which the material can be deformed, (b) this end part of the tube is thickened by subjecting the same to a deformation operation until the inner- and outer-side of the thickened part are supported by an inner- and outer supporting wall which are situated with respect to each other at a predetermined spacing, (c) the inner- and/or outer side of the thickened part of the tube is cooled down in such a way that on removal of the outer supporting wall, the thickened part of the tube substantially retains its form, while on the other hand cooling is performed in such a manner, that after removal of the outer supporting wall, the heat in a particular cross-sectional area suffices to bring this entire cross-sectional area up to at least the temperature of deformation, and (d) finally the thickened part is socketed and provided with an inner groove.

It has found that in the way manner described above a tube with a thickened socket end with a circular inner groove can be easily manufactured. Initially an end of the tube is furnished with a thickened portion due to a de-forming operation, provided it is properly arranged. After thickening operation, the inner- and/or outer side of the thickened pipe part is subjected to such a cooling treatment that such the thickened tube part retains its shape. On the other hand however, after removal of the outer supporting wall the heat in a particular cross-section suffices to bring this entire cross-section again at least up to again its deformation temperature. The cooling of the inner- and/or outer side is, however, necessary to prevent particular shape variations that could occur as a consequence of the elastic tendency of the plastic and moreover prevents creases which could easily be formed when being slid on a groove-socket-forming mandril. Cooling can be effected in a simple way by cooling the outer or inner supporting wall.

It is efficiently arranged that the inner and/or outer side of the thickened tube part are cooled in such a manner that a skin forms around the tube, having a temperature which is at least 10° lower than the temperature of the thickened plastic mass. This is satisfactorily achieved by keeping the inner side of the outer supporting wall below the deformation temperature of the plastic, but over 50° C. The deformation temperature of the plastic is, e.g. for polyvinylchloride with a temperature ranging from 130° to 150° C., for example 140° C.

The present invention also relates to tubes formed while performing the method according to the invention.

The invention relates also to devices for manufacturing a plastic tube with a thickened socket-end and provided with a circular groove. Such a device includes a socket-forming-mandril and a core part connected therewith, and a groove-forming-member provided in or on the socket-forming-mandril. The device further comprises a hollow mould, part of which can fittingly cooperate with the outer side of the socket-forming-mandril and an adjoining hollow mould part, which can be disposed in front of the core part, the inner diameter of which is greater than the outer diameter of the socket-forming-mandril, and the socket-forming mandril being provided with a groove-forming-member.

The hollow mould and groove-socket-forming mandril with core part is capable of movement in opposite directions parallel to the axis.

With such a device, plastic tubes can be easily manufactured, according to an automatic cycle, with a thickened socket end and with a circular groove. For the formation of the groove, the socket-forming-mandril is provided with an annular recess in which the groove-forming-member can be moved both inwardly and outwardly. The socket-forming-mandril also can efficiently comprise a removable core with segments to be disposed thereon which together constitute the groove-forming-member.

It has turned out that in the above mentioned way and by means of the device according to the invention, socketed tubes, which have a thickened end and are provided with a circular inner groove, can be easily manufactured in an automatic process, the properties of these tubes being better than those of the tubes previously obtained. Presumably this is connected in the special way in which the thickening as described above has been formed.

BRIEF DESCRIPTION OF THE DRAWINGS

FIG. 1 diagrammatically illustrates a device according to the invention in a particular position of the socket-forming mandril with the core part and hollow mould;

FIG. 2 shows a second position of the socket-forming mandril with the core part and the hollow mould provided therearound;

FIG. 3 shows yet another position of the socket-forming mandril and the hollow die and also a die disposed around the tube for the formation of the groove;

FIG. 4 shows a longitudinal section of a part of a device according to the invention for thickening the end part of a plastic tube;

DESCRIPTION OF PREFERRED EMBODIMENTS

Figure 5:
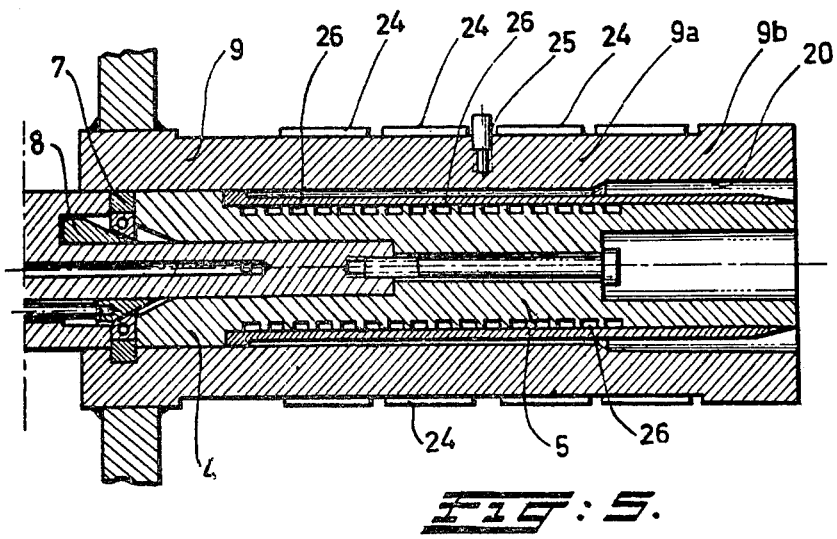
FIG. 5 shows a longitudinal section of a part of a device according to the invention for forming the groove.

In the drawings a device is illustrated for providing a plastic tube 1 with a thickened socket end 3 with an inner circular groove 2. This device comprises a groove-socket-forming mandril 4 and a core part 5, with a diameter smaller than that of the groove-socket-forming mandril 4, connected therewith.

The socket-forming mandril 4 is provided with a circular recess 6 in which a groove-forming member 7 is situated in the shape of a rubber body which can be pressed from the inner side of the socket-forming mandril 4 by means of a diagrammatically represented cone-shaped expanding part 8.

The device is further provided with a hollow mould 9, the part 9a of which can fittingly cooperate with the outer side 10 of the socket-forming mandril 4. On the other hand, the hollow mould 9 is provided with a part 9b having a greater diameter than the groove-socket-forming mandril 4. The inner diameter of the part 9b is equal to the diameter of the socket-forming mandril 4, to which is added the difference in diameter between the inner diameter of the part 9a of the hollow die and the diameter of the core part 5. The hollow mould 9 is provided with a cooling and/or heating medium inlet 11 and a cooling or heating medium outlet 12. The hollow mould 9 can also be provided with heating tapes 24 and a thermo couple 25 which controls the heating of the heating tapes for maintaining the inner side of hollow mould 9 at the desired temperature.

On the other hand, the groove-socket-forming mandril 4 is likewise provided with a cooling medium inlet 13 and a cooling medium outlet 14.

The hollow mould 9 and the socket-forming mandril 4, together with the core part 5, can be moved in opposite directions with respect to each other but coaxially with the axis of the mould by means of hydraulic device 31 connected to socket-forming mandril 4 and a roller 33 which is driven by a motor 32 engaging hollow mould 9 (see FIG. 1).

After the end of the tube has been thickened, the hollow mould 9 is slid away far enough for the formation of the groove that a groove-forming-die 15 can be disposed around the socket-forming mandril 4, the die 15 being provided with a recess 16 corresponding with the groove 2 to be formed.

Figure 6:
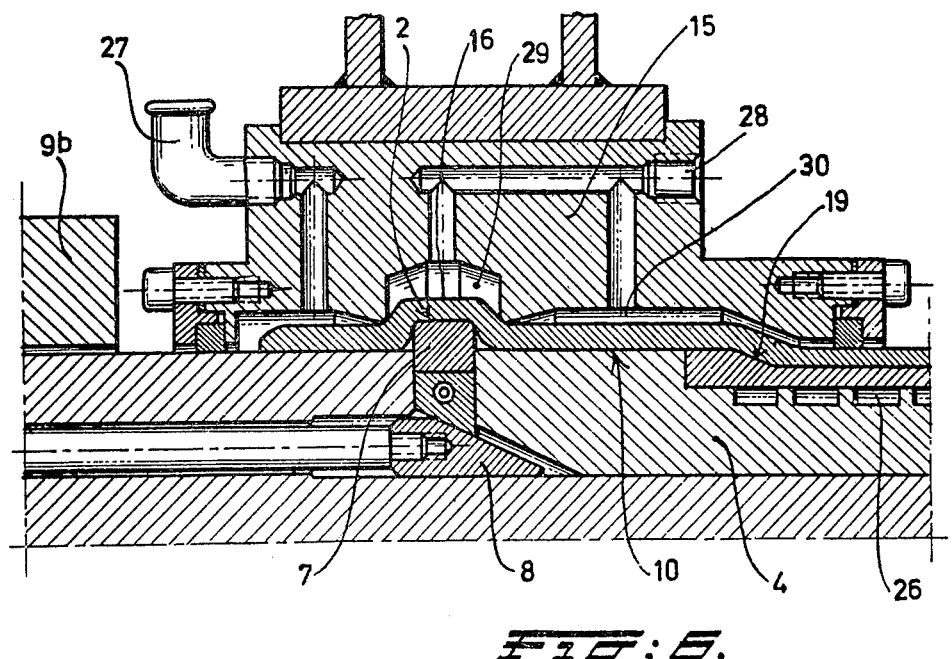
FIG. 6 shows a sectional view of a device according to the invention.

In some cases it is recommended instead of or in addition to providing the socket-forming-mandril 4 with cooling means, the forming die 15 is also provided with cooling means. Channels 26 allow for the passage of a cooling medium along the inner side of the wall of core part 5. FIG. 6 shows a first cooling medium inlet 27 for cooling the part besides the groove which is to be formed. The second cooling medium inlet 28 is provided for cooling the region of the outer side of the groove and for cooling the part beside this groove.

For the formation of a tube 1 from thermoplastic synthetic material like polyvinylchloride or polyethylene, with a circular inner groove 2, which is situated in a thickened socket end 3 of the tube, one proceeds as follows:

The end part 17 of a tube 1 made of a non-impact polyvinylchloride is heated up to a temperature ranging from 130° to 150°, for instance 140° C., corresponding with the deformation temperature of the thermoplastic synthetic material. Although the foregoing deals with polyvinylchloride, it is obvious that also other thermoplastic materials known to persons skilled in the art, can be used for this purpose.

This plastic tube 1, with its end part 17 brought into a deformable condition, is slid into the space between the hollow mould 9 and the core part 5 of the socket-forming mandril 4. This situation is represented in FIG. 1.

Thereupon the socket-forming mandril 4 and core part 5 are moved in the direction of the arrow towards the right, whereas the hollow mould 9 is moved in opposite direction. Actually it is also possible to let the hollow mould stand still and to only move the socket-forming mandril 4, while it is also possible to only move the hollow mould 9 towards the left (see arrow) and to press the non-heated part of the tube 1 next to the heated end part 17 to the left so that the wall thickness of the heated part will increase. It is evident that all possible movements are permissible which result in a thickening of the tube. During these movements, part 9b of the hollow mould 9 moves towards the position represented in FIG. 2 until the bevelled part 19 constituting the bridge part between the socket-forming mandril 4 and the core part 5 adjoins the bevelled part 18 constituting the connecting wall part between part 9a and part 9b of the hollow mould 9. Due to the distortion, this space has in the meantime will have been entirely filled with plastic, so that the thickened part 3 on the tube 1 is produced. The inner wall 20 has a temperature of over 50° C. and conveniently temperatures of approximately the transition point of glass, e.g. 75° C., are selected. After having reached the position shown in FIG. 2, the hollow mould 9 is moved towards the left, whereupon the thickened tube part 3 is slid on the socket-forming mandril 4. This socket-forming mandril is, by means of a medium supplied at 13, kept at such a temperature that the outer wall 21 of the socket-forming mandril 4 has a temperature of over 50° C. but lower than the deformation temperature of the plastic. Preferably a temperature of 75° C. is selected. It should be noted that the temperature of the wall part 20 of the hollow mould 9 should preferably likewise be brought under the deformation temperature of the plastic and that at any rate both the wall 20 and the wall 21 should have a temperature which is lower than that of the plastic mass which has been thickened. In this way a film having a temperature of at least 10° C. below the temperature of the thickened mass is obtained around the plastic, which ensures that no undesired deformations are produced under the influence of the elastic memory of the plastic after removal of the part 9b of the hollow mould. Preferably the thickened part has an inner temperature of 140° C. and an outer skin temperature of 75° C. and preferably an inner skin temperature of 75° C. or reverse.

The above mentioned film also ensures that along the outer side of the thickened part no undesired deformations are produced in this part owing to the fact that the thickened part slides over the socket-forming mandril when the tube is widened out.

After the formation of the thickened socket end of a the tube, a rubber ring 7 is expulsed from the annular groove 6 by means of the conical deforming member 8, after having provided at the location of this recess and externally around the socket end a mould 15 with a recess 16. Under the influence of ring 7, the plastic mass is pressed into the recess 16, whereby the groove 2 is formed. It will be clear that in this way by consecutively upsetting, thickening, widening out and grooving, a tube of the desired type can be obtained.

Very essential for the method according to the invention is the formation of a film of lower temperature along the outer side of the thickened part, however, in such a way that the total heat contents of a particular cross-section suffices to bring up again, for example after removal of the outer supporting wall in the shape of the die part 9b, the entire cross-section to at least the deformation temperature. In this way a certain stabilisation of the plastic mass is obtained, whereby the elastic memory cannot give rise to trouble.

The groove may also be formed by other means, e.g., a spreader-core or a device as shown in FIG. 4. In this figure the socket-forming-mandril is provided at its end with a part having a removable core 23 and parts 22 provided thereon, forming together a circular groove. After having slid the thickened part of the tube over these parts forming together the groove, the removable core is removed whereby the groove-forming parts can be easily removed from the inner side of the tube.

It is obvious that instead of forming the socket and the groove in the aforementioned way, an outer die also could be used into which the thickened part is blown. In that case the mould 15 extends on the entire thickened part, while within the thickened part provisions can be disposed for inflating and adapting the part to the mould 15.

What we claim is:

1. A device for forming a plastic tube with a thickened socket end comprising:
    (a) a socket-forming cylindrical mandril and a cylindrical core member coupled together through a bevelled connecting surface, said mandril having an outer diameter greater than the outer diameter of said core member, said core member serving to receive over its outer surface a tube to be deformed;
    (b) a hollow cylindrical mould having a first cylindrical mould portion fittingly and slidably engaging the outerside of said socket-forming mandril such that said first mould portion is at least partially positioned over said socket-forming mandril;
    (c) a second cylindrical hollow mould portion connected to said first cylindrical mould portion, said second cylindrical hollow mould portion being disposed over said core member and having an inner diameter greater than the outer diameter of said socket-forming cylindrical mandril, said second cylindrical mould portion covering a portion of a tube to be deformed when such a tube is positioned over said core member;
    (d) one of said socket-forming cylindrical mandril and said hollow cylindrical mould including means for passing cooling medium therethrough for cooling at least one of the surfaces of the plastic tube, after deformation, in an area adjacent to either said hollow cylindrical mould or said cylindrical core member;
    (e) means for coaxially moving said hollow mould and said socket-forming mandril in opposite directions such that when a tube is placed over said core member and between said core member and said hollow mould, the end of the tube therebetween then being heated to its deformation point, the end of the tube will first expand so as to contact the second cylindrical hollow mould portion and then be allowed to slide over onto the outer side of said socket-forming mandril to form said thickened socket end; and
    (f) said cylindrical mandril including means for forming a groove within the side of said thickened socket end in contact with said outer side of said socket-forming mandril.

2. A device as defined in claim 1, wherein said means for forming a groove within the side of said thickened socket end in contact with said outer side of said socket-forming mandril comprises a groove-forming member positioned in an annular recess in said socket-forming mandril, and means are provided within said mandril to move said member in a radial direction when said thickened socket end is thereover.

3. A device as defined in claim 1, wherein said socket-forming cylindrical mandril includes a removable core and a plurality of segments disposed on said core and which define, together with said removable core, said means for forming a groove within the side of said thickened socket end in contact with said outer side of said socket-forming mandril.

4. A device as defined in claim 1, wherein the inner diameter of said second cylindrical hollow mould portion of said hollow cylindrical mould is equal to the sum of the outer diameter of said socket-forming cylindrical mandril and the difference in diameters between the diameter of said socket-formimg cylindrical mandril and the diameter of said cylindrical core member.

* * * * *